(12) United States Patent
Fish (10) Patent No.: US 10,602,737 B1
(45) Date of Patent: Mar. 31, 2020

(54) POLE-TOP BIRD SPIKE KIT (71) Applicant: Robert D. Fish, Irvine, CA (US)

(72) Inventor: Robert D. Fish, Irvine, CA (US)

(*) Notice: Subject to any disclaimer, the term of this patent is extended or adjusted under 35 U.S.C. 154(b) by 0 days.

(21) Appl. No.: 16/295,372

(22) Filed: Mar. 7, 2019

(51) Int. Cl.
*A01M 29/32* (2011.01)
*F16M 13/02* (2006.01)

(52) U.S. Cl.
CPC ............ *A01M 29/32* (2013.01); *F16M 13/02* (2013.01)

(58) Field of Classification Search
CPC .............................. A01M 29/30; A01M 29/32
USPC ........................................................... 52/101
See application file for complete search history.

(56) References Cited

U.S. PATENT DOCUMENTS

| | | | |
|---|---|---|---|
| 2,475,047 A * | 7/1949 | Stanley | A01M 29/32 52/101 |
| 3,282,000 A * | 11/1966 | Shaw | E04D 13/004 52/101 |
| 4,161,090 A | 7/1979 | Watts, Jr. | |
| 5,253,444 A * | 10/1993 | Donoho | A01M 29/32 43/1 |
| 5,709,057 A | 1/1998 | Johnson, Jr. et al. | |
| 2003/0182876 A1 * | 10/2003 | Landers | A01M 29/06 52/101 |
| 2018/0343850 A1 | 12/2018 | Bernacki | |

FOREIGN PATENT DOCUMENTS

| | | | | |
|---|---|---|---|---|
| CN | 201708507 | | 1/2011 | |
| CN | 202285999 | | 7/2012 | |
| EP | 2636305 A1 | * | 9/2013 | ............ A01M 29/32 |
| FR | 2682558 A1 | * | 4/1993 | ............ A01M 29/32 |

* cited by examiner

*Primary Examiner* — Robert Canfield
(74) *Attorney, Agent, or Firm* — Fish IP Law, LLP (57) ABSTRACT

A modular pest deterrent kit is configured to mate with one or more types of pole tops. The modular pest deterrent kit comprises a spike having a first coupling member and a base having a second coupling member configured to mate with the first coupling member. The base is contemplated to have a first bottom surface. An alternative base is contemplated to have a third coupling member configured to mate with the first coupling member. The alternative base has a second bottom surface, which is differently shaped from the first bottom surface.

11 Claims, 9 Drawing Sheets

POLE-TOP BIRD SPIKE KIT

FIELD OF THE INVENTION

The field of the invention is avian deterrent systems.

BACKGROUND

Avian pests often perch on top of poles, which can cause a permanent chemical and/or physical damage to the pole itself, and any objects associated therewith. For example, when avian pests perch on top of the pole of a patio umbrella, they can leave physical damage from their talons, and also chemical-based damage to components including the pole, the pole top, the umbrella fabric, and any furniture or flooring beneath the patio umbrella. Further, excrement from avian pests can cause unsightly stains.

U.S. Pat. No. 4,161,090 to Watts discloses a glue-or adhesive-based method for capping a post assembly, but is only suitable for mating with a rectangular post. The reality is that many posts have a rounded top.

U.S. Pat. No. 5,709,057 to Johnson uses a sliding mechanism, but has a similar drawback in that the mechanism cannot accommodate different shapes upon which the device is likely to be utilized.

Watts, Johnson, and all other extrinsic materials discussed herein are incorporated by reference to the same extent as if each individual extrinsic material was specifically and individually indicated to be incorporated by reference. Where a definition or use of a term in an incorporated reference is inconsistent or contrary to the definition of that term provided herein, the definition of that term provided herein applies and the definition of that term in the reference does not apply.

As pole tops can be a variety of shapes, sizes, and configurations, a modular system that with spike bases that mate with multiple types of pole tops improves upon systems that are tailored to one shapes and sizes of pole top. Thus, modular pole-top bird deterrent kits can advantageously allow a variety of pole tops to be fitted with any type of pest deterrent attachment.

SUMMARY OF THE INVENTION

Among other things, the inventive subject matter provides apparatus, systems, and methods for a modular pest deterrent kit, configured to mate with one or more shapes and sizes of pole tops. In preferred embodiments, the kit includes a spike that can be alternatively coupled with different sizes and shapes of bases.

Various resources, features, aspects and advantages of the inventive subject matter will become more apparent from the following detailed description of preferred embodiments, along with the accompanying drawing figures in which like numerals represent like components.

The present invention advantageously allows avian pest deterrents to be installed on various types of pole tops and reconfigured based on the type of pest to be deterred.

DETAILED DESCRIPTION

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figure 1A:
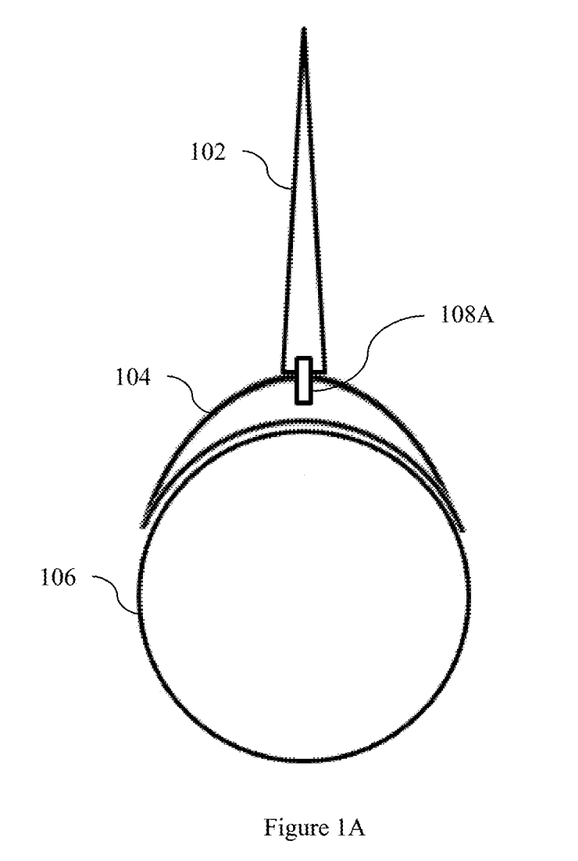
FIG. 1A depicts a cross-sectional view of pole-top bird spike in which a spike and a spike base rests upon a spherical pole top.

FIG. 1A depicts a cross-sectional view of pole-top bird spike 100 in which a spike and a spike base rests upon a spherical pole top.

As depicted, pole top bird spike 100 comprises a spike 102, a spike base 104, spherical pole top 106, and a spike coupler 108A.

Spike 102 can be any suitable pest deterring spike. In the depicted embodiment, spike 102 is a single spike with a coupling portion at an end of spike 102 configured to couple to spike base 104. In other embodiments, spike 102 can be any form that deters pests from sitting on top of poles where pole top bird spike 100 is installed. Alternative embodiments of spike 102 are described in detail below.

Spike base 104 can be any base that is adapted to receive a physical structure at a first end, and spike 102 on the opposite end. In the depicted embodiment, spike base 104 is concave at one end to receive spherical pole top 106, and convex at the opposite end, with a second coupling portion adapted to couple to spike 102. However, spike base 104 can be shaped to mate with any structural shape, including, for example, horizontal tubular poles and planar surfaces.

Spherical pole top 106 depicts a conventional pole top. However, since there are many different diameters of spherical pole tops, a kit having bases with multiple different concave radii is utilized to accommodate the different diameters.

It is contemplated that spherical pole top 106 can couple with spike base 104 using any suitable coupling mechanism. In preferred embodiments, spherical pole top 106 removably couples to spike base 104 using a glue, adhesive, or cement, any of which could be strong enough to be more or less permanent.

Where spherical pole top 106 includes a ferrous material, spike base 104 could include a magnetic medium, such that spherical pole top 106 could alternatively to spike base 104 using a magnetic coupling mechanism.

In yet another embodiment, spherical pole top 106 removable couples to spike base 104 using a mechanical coupling mechanism. For example, spherical pole top 106 can couple to spike base 104 using physical screws that mechanically bind spherical pole top 106 and spike base 104 together. In another example, spherical pole top 106 can couple to spike base 104 using a hook and loop fastener.

In yet another embodiment, spherical pole top 106 removably couples to spike base friction-based coupling mechanism. For example, spike base 104 can be made of a resilient material, such as silicon, that removably couples to spherical pole top 106 using friction to keep spike base 104 in place. In a related example, spike base 104 can further increase friction by increasing the surface area of spike base 104 in direct contact with spherical pole top 106 using negative pressure, including, for example, suction-based attachment mechanisms.

Spike coupler 108A can be any means of coupling spike 102 to spike base 104. In the depicted embodiment, spike coupler 108A is a screw mechanism that couples at a first end to spike 102 and on a second end to spike base 104.

In another embodiment, spike coupler 108A is a peg mechanism that couples at a first end to a first cavity in spike 102 and at a second end to a second cavity in spike base 104. For example, spike coupler 108A can be a peg that is sized and dimensioned to achieve a friction fit with spike 102 and spike base 104.

In yet another embodiment, spike coupler 108A can be one or more magnetic components that magnetically couple to spike 102 and spike base 104. For example, spike coupler 108A can comprise two neodymium magnets that are incorporated into spike 102 and spike base 104, respectively.

Spike coupler 108A can also be a combination of any attachment mechanisms known in the art. For example, spike coupler 108A can be a magnetic peg that couples spike 102 and spike base 104 using a combination of magnetic and mechanical attachment mechanisms.

Figure 1B:
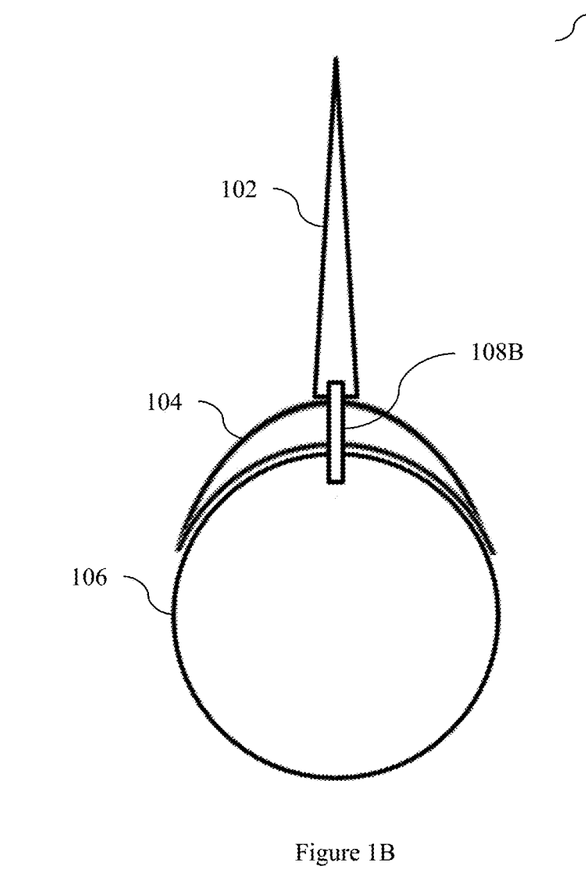
FIG. 1B depicts a cross-sectional view of a pole-top bird spike in which a spike and a spike base rests upon a spherical pole top.

FIG. 1B depicts a cross-sectional view of a pole-top bird spike where a spike is coupled to a circular pole top through a spike base.

As depicted, pole top bird spike 100 comprises spike 102, spike base 104, spherical pole top 106 and spike coupler 108B.

Spike 102 can be any suitable pest deterring spike. In the depicted embodiment, spike 102 is a single spike with a coupling portion at an end of spike 102 configured to couple to spike base 104. In other embodiments, spike 102 can be any form that deters pests from sitting on top of poles where pole top bird spike 100 is installed. Alternative embodiments of spike 102 are described in detail below.

Spike base 104 can be any base that is adapted to receive a pole top at a first end and spike 102 on the opposite end.

In the depicted embodiment, spike base 104 is concave at one end to receive spherical pole top 106 and convex at the opposite end with a second coupling portion adapted to couple to spike 102.

Spherical pole top 106 depicts a conventional pole top. Spherical pole top 106 is adapted to mate with the concave portion of spike base 104. It is contemplated that spherical pole top 106 can couple with spike base 104 using any coupling mechanism known in the art.

Spike coupler 108B can be any coupling mechanism that can couple spike 102 and spherical pole top 106 together through an intermediate object. In the depicted embodiment, spike coupler 108B removably attaches spike 102 at a first end using a screw-based mechanism and to spherical pole top 106 through spike base 104.

In another embodiment, spike coupler 108B is a peg mechanism that couples at a first end to a first cavity in spike 102, through a through-hole in spike base 104, and at a second end into a second cavity to spherical pole top 106. For example, spike coupler 108A can be a peg that is sized and dimensioned to achieve a friction fit with at least spike 102 and spherical pole top 106.

In yet another embodiment, spike coupler 108B can be one or more magnetic components that magnetically couple to spike 102 and spherical pole top 106. For example, spike coupler 108B can comprise two neodymium magnets that attach at opposite ends to spike 102 and spherical pole top 106.

Spike coupler 108B can also be a combination of any attachment mechanisms known in the art. For example, spike coupler 108B can be a magnetic peg that couples spike 102 and spherical pole top 106 using a combination of magnetic and mechanical attachment mechanisms.

Figure 2A:
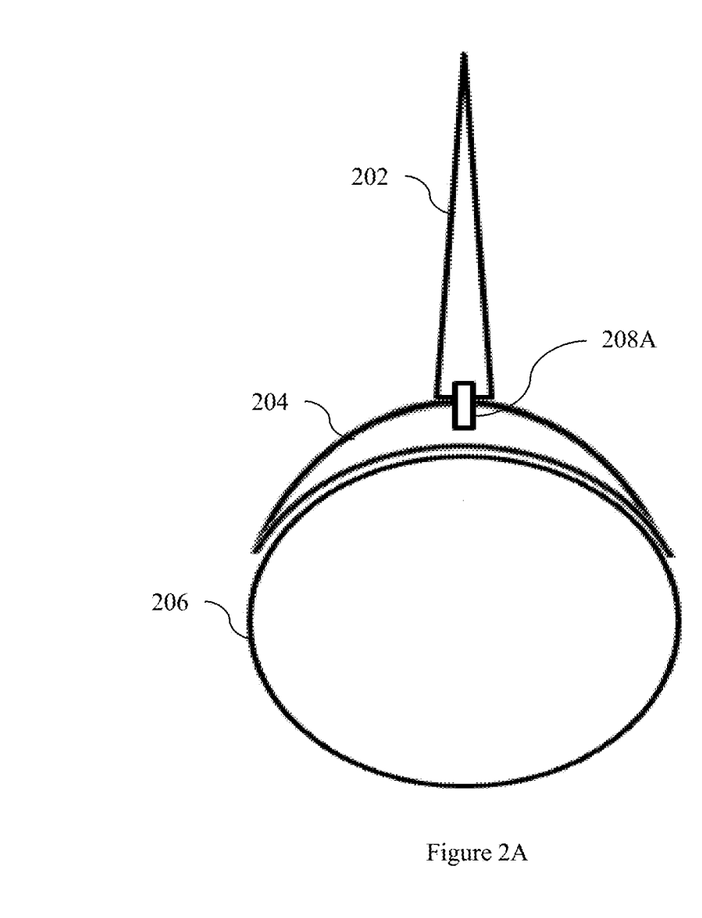
FIG. 2A depicts a cross-sectional view of pole-top bird spike in which a spike and a spike base rests upon an ellipsoid-shaped pole top.

FIG. 2A depicts a cross-sectional view of pole-top bird spike in which a spike and a spike base rests upon an ellipsoid-shaped pole top.

As depicted, pole top bird spike 100 comprises spike 202, spike base 204, ellipsoid-shaped pole top 206 and spike coupler 208A.

Spike 202 can be any suitable pest deterring spike. In the depicted embodiment, spike 202 is a single spike with a coupling portion at an end of spike 202 configured to couple to spike base 204. In other embodiments, spike 202 can be any form that deters pests from sitting on top of poles where pole top bird spike 100 is installed. Alternative embodiments of spike 202 are described in detail below.

Spike base 204 can be any base that is adapted to receive a pole top at a first end and spike 202 on the opposite end. In the depicted embodiment, spike base 204 is concave at one end to receive ellipsoid-shaped pole top 206 and convex at the opposite end with a second coupling portion adapted to couple to spike 202.

Ellipsoid-shaped pole top 206 depicts a conventional pole top. Ellipsoid-shaped pole top 206 is adapted to mate with the concave portion of spike base 204. It is contemplated that ellipsoid-shaped pole top 206 can couple with spike base 204 using any coupling mechanism known in the art.

Spike coupler 208A can be any coupling mechanism that can couple spike 202 and spike base 204. In the depicted embodiment, spike coupler 208A removably attaches spike 202 at a first end using a screw-based mechanism to spike base 204 at a second end.

In another embodiment, spike coupler 208A is a peg mechanism that couples at a first end to a first cavity in spike 202 and at a second end into a second cavity in spike base 204. For example, spike coupler 208A can be a peg that is sized and dimensioned to achieve a friction fit with at least spike 202 and spike base 204.

In yet another embodiment, spike coupler 208A can be one or more magnetic components that magnetically couple to spike 202 and spike base 204. For example, spike coupler 208A can comprise two neodymium magnets that attach at opposite ends to spike 202 and spike base 204.

Spike coupler 208A can also be a combination of any attachment mechanisms known in the art. For example, spike coupler 208A can be a magnetic peg that couples spike 202 and spike base 204 using any one or more of magnetic, chemical, and mechanical attachment mechanisms.

Figure 2B:
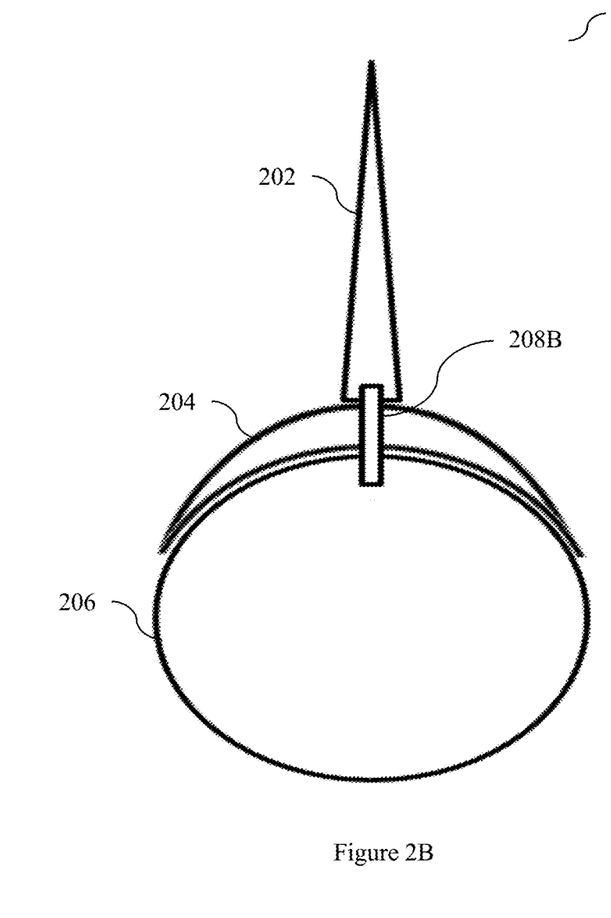
FIG. 2B depicts a cross-sectional view of a pole-top bird spike where a spike is coupled to an ellipsoid-shaped pole top through a spike base.

FIG. 2B depicts a cross-sectional view of a pole-top bird spike where a spike is coupled to an ellipsoid-shaped pole top through a spike base.

As depicted, pole top bird spike 100 comprises spike 202, spike base 204, ellipsoid-shaped pole top 206 and spike coupler 208B.

Spike 202 can be any suitable pest deterring spike. In the depicted embodiment, spike 202 is a single spike with a coupling portion at an end of spike 202 configured to couple to spike base 204. In other embodiments, spike 202 can be any form that deters pests from sitting on top of poles where pole top bird spike 100 is installed. Alternative embodiments of spike 202 are described in detail below.

Spike base 204 can be any base that is adapted to receive a pole top at a first end and spike 202 on the opposite end. In the depicted embodiment, spike base 204 is concave at one end to receive ellipsoid-shaped pole top 206 and convex at the opposite end with a second coupling portion adapted to couple to spike 202.

Ellipsoid-shaped pole top 206 depicts a conventional pole top. Ellipsoid-shaped pole top 206 is adapted to mate with the concave portion of spike base 204. It is contemplated that ellipsoid-shaped pole top 206 can couple with spike base 204 using any coupling mechanism known in the art.

Spike coupler 208B can be any coupling mechanism that can couple spike 202 and ellipsoid-shaped pole top 206 together through an intermediate object. In the depicted embodiment, spike coupler 108B removably attaches spike 202 at a first end using a screw-based mechanism and to ellipsoid-shaped pole top 206 through spike base 204.

In another embodiment, spike coupler 208B is a peg mechanism that couples at a first end to a first cavity in spike 202, through a through-hole in spike base 204, and at a second end to a second cavity to ellipsoid-shaped pole top 206. For example, spike coupler 208B can be a peg that is sized and dimensioned to achieve a friction fit with at least spike 202 and ellipsoid-shaped pole top 206.

In yet another embodiment, spike coupler 208B can be one or more magnetic components that magnetically couple to spike 202 and ellipsoid-shaped pole top 206. For example, spike coupler 208B can comprise two neodymium magnets that attach at opposite ends to spike 202 and ellipsoid-shaped pole top 206.

Spike coupler 208B can also be a combination of any attachment mechanisms known in the art. For example, spike coupler 208B can be a magnetic peg that couples spike 202 and ellipsoid-shaped pole top 206 using a combination of magnetic and mechanical attachment mechanisms.

Figure 3A:
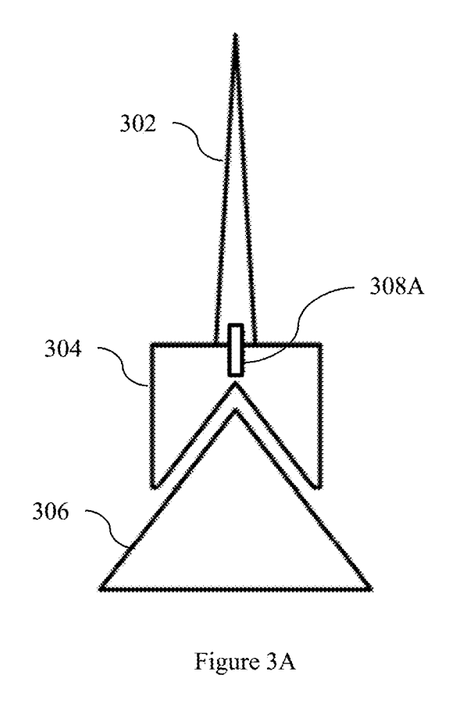
FIG. 3A depicts a cross-sectional view of pole-top bird spike in which a spike and a spike base rests upon a square pyramid-shaped pole top.

FIG. 3A depicts a cross-sectional view of pole-top bird spike in which a spike and a spike base rests upon a square pyramid-shaped pole top.

As depicted, pole top bird spike 100 comprises spike 302, spike base 304, pyramid-shaped pole top 306 and spike coupler 308A.

Spike 302 can be any suitable pest deterring spike. In the depicted embodiment, spike 302 is a single spike with a coupling portion at an end of spike 302 configured to couple to spike base 304. In other embodiments, spike 302 can be any form that deters pests from sitting on top of poles where pole top bird spike 100 is installed. Alternative embodiments of spike 302 are described in detail below.

Spike base 304 can be any base that is adapted to receive a pole top at a first end and spike 302 on the opposite end. In the depicted embodiment, spike base 304 is concave at one end to receive pyramid-shaped pole top 306 and convex at the opposite end with a second coupling portion adapted to couple to spike 302.

Pyramid-shaped pole top 306 depicts a conventional pole top. Pyramid-shaped pole top 306 is adapted to mate with the concave portion of spike base 304. It is contemplated that pyramid-shaped pole top 306 can couple with spike base 304 using any coupling mechanism known in the art.

Spike coupler 308A can be any coupling mechanism that can couple spike 302 and spike base 304. In the depicted embodiment, spike coupler 308A removably attaches spike 302 at a first end using a screw-based mechanism to spike base 304 at a second end.

In another embodiment, spike coupler 308A is a peg mechanism that couples at a first end to a first cavity in spike 302 and at a second end into a second cavity in spike base 304. For example, spike coupler 308A can be a peg that is sized and dimensioned to achieve a friction fit with at least spike 302 and spike base 304.

In yet another embodiment, spike coupler 308A comprises one or more magnetic components that magnetically couple to spike 302 and spike base 304. For example, spike coupler 308A can comprise two neodymium magnets that attach at opposite ends to spike 302 and spike base 304.

Spike coupler 308A can also be a combination of any attachment mechanisms known in the art. For example, spike coupler 308A can be a magnetic peg that couples spike 302 and spike base 304 using any one or more of magnetic, chemical, and mechanical attachment mechanisms.

Figure 3B:
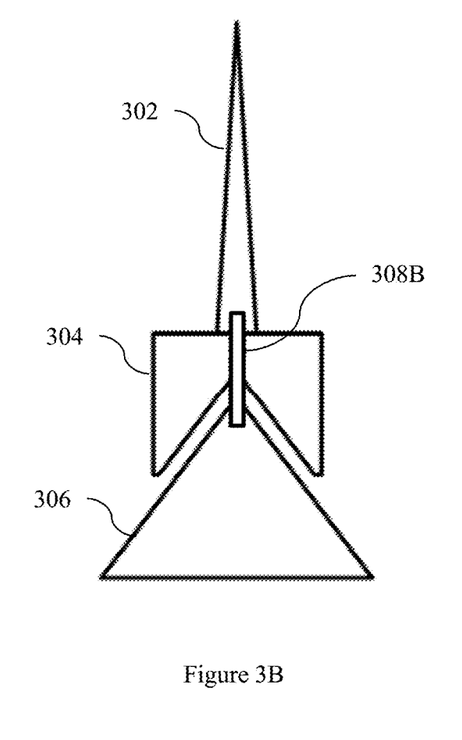
FIG. 3B depicts a cross-sectional view of a pole-top bird spike where a spike is coupled to a square pyramid-shaped pole top through a spike base.

FIG. 3B depicts a cross-sectional view of a pole-top bird spike where a spike is coupled to a square pyramid-shaped pole top through a spike base.

As depicted, pole top bird spike 100 comprises spike 302, spike base 304, pyramid-shaped pole top 306 and spike coupler 308B.

Spike 302 can be any suitable pest deterring spike. In the depicted embodiment, spike 302 is a single spike with a coupling portion at an end of spike 302 configured to couple to spike base 304. In other embodiments, spike 302 can be any form that deters pests from sitting on top of poles where pole top bird spike 100 is installed. Alternative embodiments of spike 302 are described in detail below.

Spike base 304 can be any base that is adapted to receive a pole top at a first end and spike 302 on the opposite end. In the depicted embodiment, spike base 304 is concave at one end to receive pyramid-shaped pole top 306 and convex at the opposite end with a second coupling portion adapted to couple to spike 302.

Pyramid-shaped pole top 306 depicts a conventional pole top. Pyramid-shaped pole top 306 is adapted to mate with the concave portion of spike base 304. It is contemplated that pyramid-shaped pole top 306 can couple with spike base 304 using any coupling mechanism known in the art.

Spike coupler 308B can be any coupling mechanism that can couple spike 302 and pyramid-shaped pole top 306 together through an intermediate object. In the depicted embodiment, spike coupler 308B removably attaches spike 302 at a first end using a screw-based mechanism and to pyramid-shaped pole top 306 through spike base 304.

In another embodiment, spike coupler 308B is a peg mechanism that couples at a first end to a first cavity in spike 302, through a through-hole in spike base 304, and at a second end to a second cavity to pyramid-shaped pole top 306. For example, spike coupler 308B can be a peg that is sized and dimensioned to achieve a friction fit with at least spike 302 and pyramid-shaped pole top 306.

In yet another embodiment, spike coupler 308B comprises one or more magnetic components that magnetically couple to spike 302 and pyramid-shaped pole top 306. For example, spike coupler 308B can comprise two neodymium magnets that attach at opposite ends to spike 302 and pyramid-shaped pole top 306.

Spike coupler 308B can also be a combination of any attachment mechanisms known in the art. For example, spike coupler 308B can be a magnetic peg that couples spike 302 and pyramid-shaped pole top 306 using a combination of magnetic and mechanical attachment mechanisms.

Figure 4A:
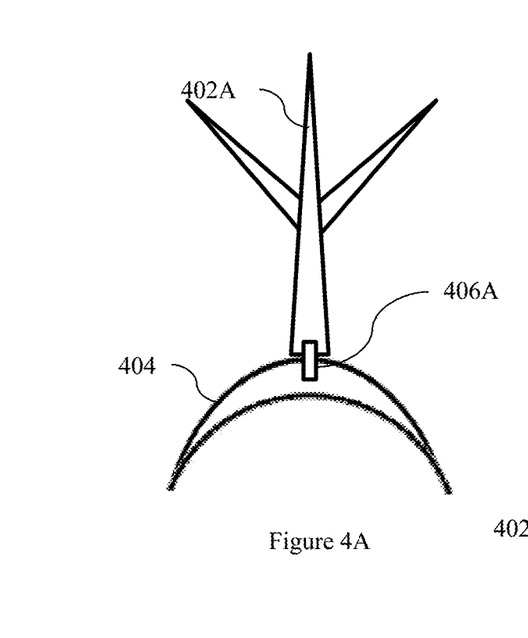
FIG. 4A depicts a cross-sectional view of pole-top bird spike where a trident-shaped spike is coupled to a spike base.

FIG. 4A depicts a cross-sectional view of pole-top bird spike where a trident-shaped spike is coupled to a spike base.

As depicted, pole top bird spike 100 comprises trident-shaped spike 402A, spike base 404, and spike coupler 406A.

Trident-shaped spike 402A can comprise a central spike with any number of offshoots from the central spike. In the depicted embodiment, trident-shaped spike 402A includes two spikes that are anchored to the central spike that radiate outwardly.

In some embodiments, trident-shaped spike 402A includes non-spike-based offshoots. For example, trident-shaped spike 402A can be attached to two spikes and one chemical pest deterrent. In another example, trident-shaped spike 402A can be attached to one or more spikes and an electricity-based deterrent, such as an electrical shock device. In yet another example, trident-shaped spike 402A can be attached to one or more spikes and a pest deterrent light.

It is contemplated that trident-shaped spike 402A can be coupled to a power source if one or more attachments require an external source of energy. In some embodiments, the power source is attached to the central spike, including, for example, a solar panel and rechargeable battery coupled to trident-shaped spike 402A.

Spike coupler 406A can be any coupling mechanism that can couple trident-shaped spike 402A and spike base 404. In the depicted embodiment, spike coupler 406A removably attaches trident-shaped spike 402A at a first end using a screw-based mechanism to spike base 404 at a second end.

In another embodiment, spike coupler 406A is a peg mechanism that couples at a first end to a first cavity in trident-shaped spike 402A and at a second end into a second cavity in spike base 404. For example, spike coupler 406A can be a peg that is sized and dimensioned to achieve a friction fit with at least trident-shaped spike 402A and spike base 404.

In yet another embodiment, spike coupler 406A comprises one or more magnetic components that magnetically couple to trident-shaped spike 402A and spike base 404. For example, spike coupler 406A can comprise two neodymium magnets that attach at opposite ends to trident-shaped spike 402A and spike base 404.

Spike coupler 406A can also be a combination of any attachment mechanisms known in the art. For example, spike coupler 406A can be a magnetic peg that couples trident-shaped spike 402A and spike base 404 using any one or more of magnetic, chemical, and mechanical attachment mechanisms.

Figure 4B:
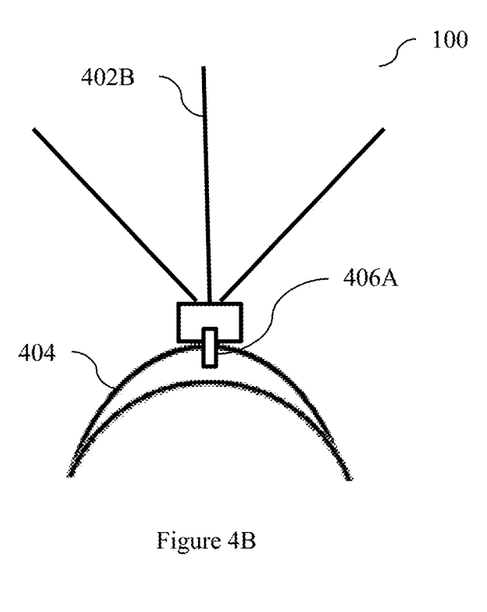
FIG. 4B depicts a cross-sectional view of a pole-top bird spike where a three-pronged spike assembly is coupled to a spike base.

FIG. 4B depicts a cross-sectional view of a pole-top bird spike where a pronged spike assembly is coupled to a spike base.

As depicted, pole top bird spike 100 comprises pronged spike 402B, spike base 404, and spike coupler 406A.

Pronged spike 402B can any number of individual spikes that offshoot from a common base. In the depicted embodiment, pronged spike 402B includes three spikes that are anchored to a base and radiate outwardly from the base.

In some embodiments, pronged spike 402B includes non-spike-based offshoots. For example, pronged spike 402B can comprise two spikes and one chemical pest deterrent. In another example, pronged spike 402B can be attached to one or more spikes and an electricity-based deterrent, such as an electrical shock device. In yet another example, pronged spike 402B can be attached to one or more spikes and a pest deterrent light.

It is contemplated that pronged spike 402B can be coupled to a power source if one or more attachments require an external source of energy. In some embodiments, the power source is attached to the central spike, including, for example, a solar panel and rechargeable battery coupled to pronged spike 402B.

Spike coupler 406A can be any coupling mechanism that can couple pronged spike 402B and spike base 404. In the depicted embodiment, spike coupler 406A removably attaches pronged spike 402B at a first end using a screw-based mechanism to spike base 404 at a second end.

In another embodiment, spike coupler 406A is a peg mechanism that couples at a first end to a first cavity in pronged spike 402B and at a second end into a second cavity in spike base 404. For example, spike coupler 406A can be a peg that is sized and dimensioned to achieve a friction fit with at least pronged spike 402B and spike base 404.

In yet another embodiment, spike coupler 406A comprises one or more magnetic components that magnetically couple to pronged spike 402B and spike base 404. For example, spike coupler 406A can comprise two neodymium magnets that attach at opposite ends to pronged spike 402B and spike base 404.

Spike coupler 406A can also be a combination of any attachment mechanisms known in the art. For example, spike coupler 406A can be a magnetic peg that couples pronged spike 402B and spike base 404 using any one or more of magnetic, chemical, and mechanical attachment mechanisms.

Figure 4C:
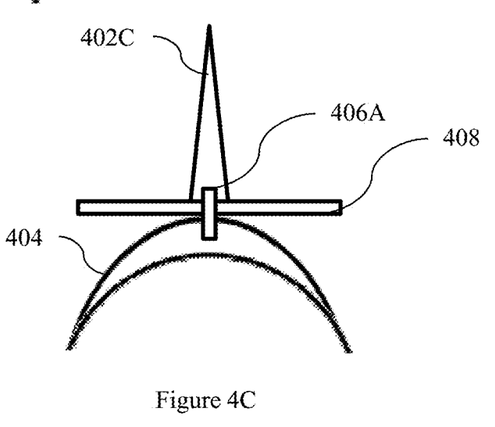
FIG. 4C depicts a cross-sectional view of pole-top bird spike where a spike coupled to a spike base through a circular platform.

FIG. 4C depicts a cross-sectional view of pole-top bird spike where a spike is coupled to a spike base through a circular platform.

As depicted, pole top bird spike 100 comprises spike 402C, spike base 404, spike coupler 406B, and platform 408.

Spike 402C can be any suitable pest deterring spike. In the depicted embodiment, spike 402C is a single spike with a coupling portion at an end of spike 402C configured to couple to spike base 304. In other embodiments, spike 402C can be any form that deters pests from sitting on top of poles where pole top bird spike 100 is installed.

In some embodiments, spike 402C comprises a non-spike-based pest deterrent or pest control solution. For example, spike 402C can comprise a spike coated in a chemical pest deterrent. In another example, spike 402C can comprise an electricity-based deterrent, such as an electrical shock device to deter avian pests and electrocute flying insects. In yet another example, spike 402C can include a pest deterrent light.

It is contemplated that spike 402C can be coupled to a power source if one or more attachments require an external source of energy. In some embodiments, the power source, including, for example, a solar panel and rechargeable battery is coupled to spike 402C.

Spike coupler 406A can be any coupling mechanism that can couple spike 402C and spike base 404. In the depicted embodiment, spike coupler 406A removably attaches spike 402C at a first end using a screw-based mechanism to spike base 404 at a second end.

In another embodiment, spike coupler 406A is a peg mechanism that couples at a first end to a first cavity in spike 402C and at a second end into a second cavity in spike base 404. For example, spike coupler 406A can be a peg that is sized and dimensioned to achieve a friction fit with at least spike 402C and spike base 404.

In yet another embodiment, spike coupler 406A comprises one or more magnetic components that magnetically couple to spike 402C and spike base 404. For example, spike coupler 406A can comprise two neodymium magnets that attach at opposite ends to spike 402C and spike base 404.

Spike coupler 406A can also be a combination of any attachment mechanisms known in the art. For example, spike coupler 406A can be a magnetic peg that couples spike 402C and spike base 404 using any one or more of magnetic, chemical, and mechanical attachment mechanisms.

In the depicted embodiment, spike coupler 406A couples to spike 402C through platform 408. Platform 408 can be any intermediate object between spike 402C and spike base 404.

In one embodiment, platform 408 is a circular platform that prevents excrement from avian pests from landing on the pole top and causing damage. In another embodiment, platform 408 comprises one or more sharp points to further deter avian pests from resting on pole tops. For example, platform 408 can be shaped in a six-pointed star. In yet another embodiment, platform 408 includes alternative avian pest deterrents. For example, platform 408 can comprise any one or more of an electrical shock-based deterrent, a chemical pest deterrent, a light-based pest deterrent, and a sound-based pest deterrent.

Figure 5:
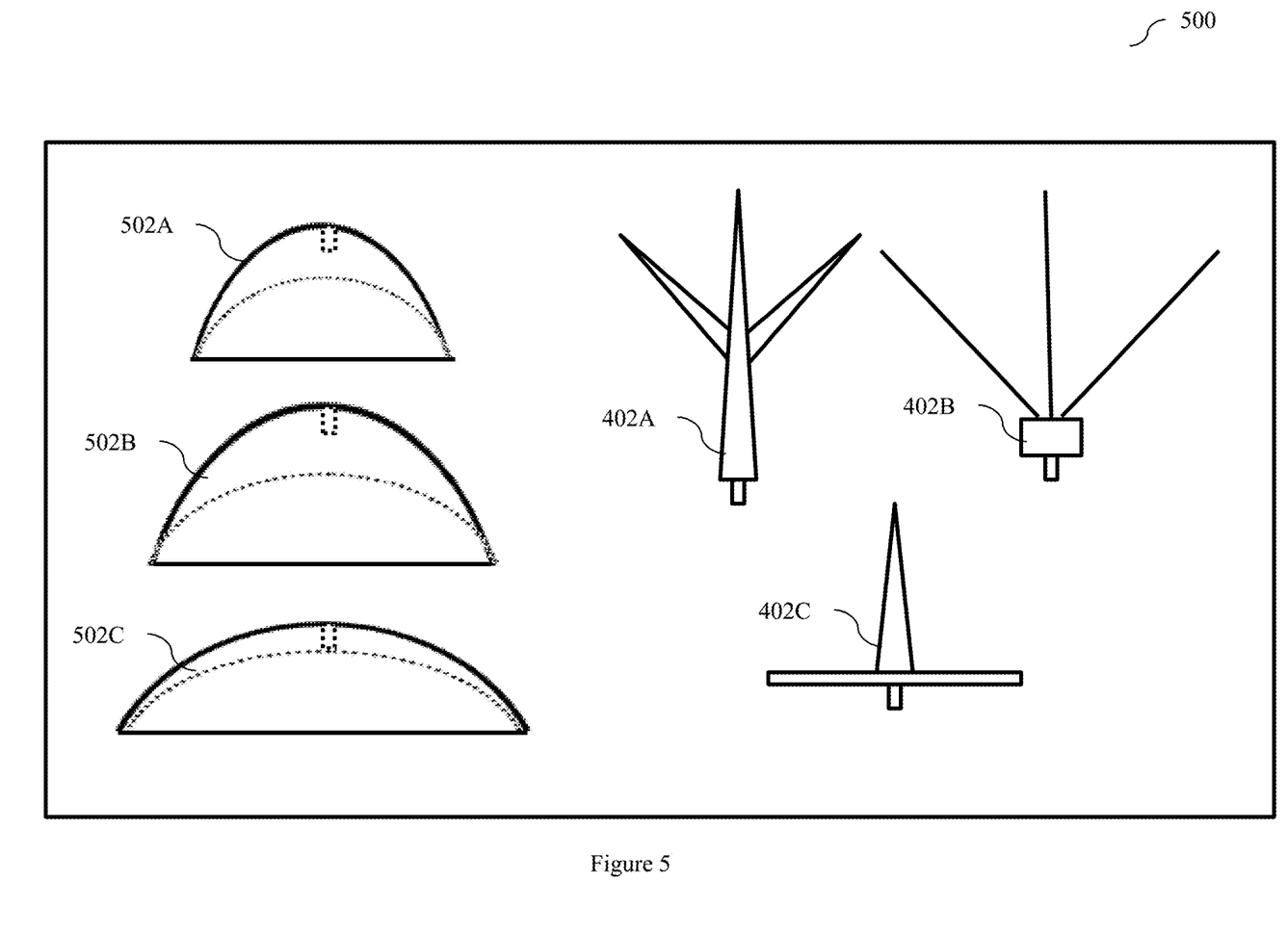
FIG. 5 depicts a kit containing three pole-top spike bases with three respective concavities adapted to receive differently sized spherical pole tops and three types of spikes.

FIG. 5 depicts a kit containing three pole-top spike bases with three respective concavities adapted to receive differently sized spherical pole tops and three types of spikes.

Bird spike and adapter kit 500 includes first spike base 502A, second spike base 502B, third spike base 502C, trident-shaped spike 402A, pronged spike 402B, and spike 402C.

Figure 6:
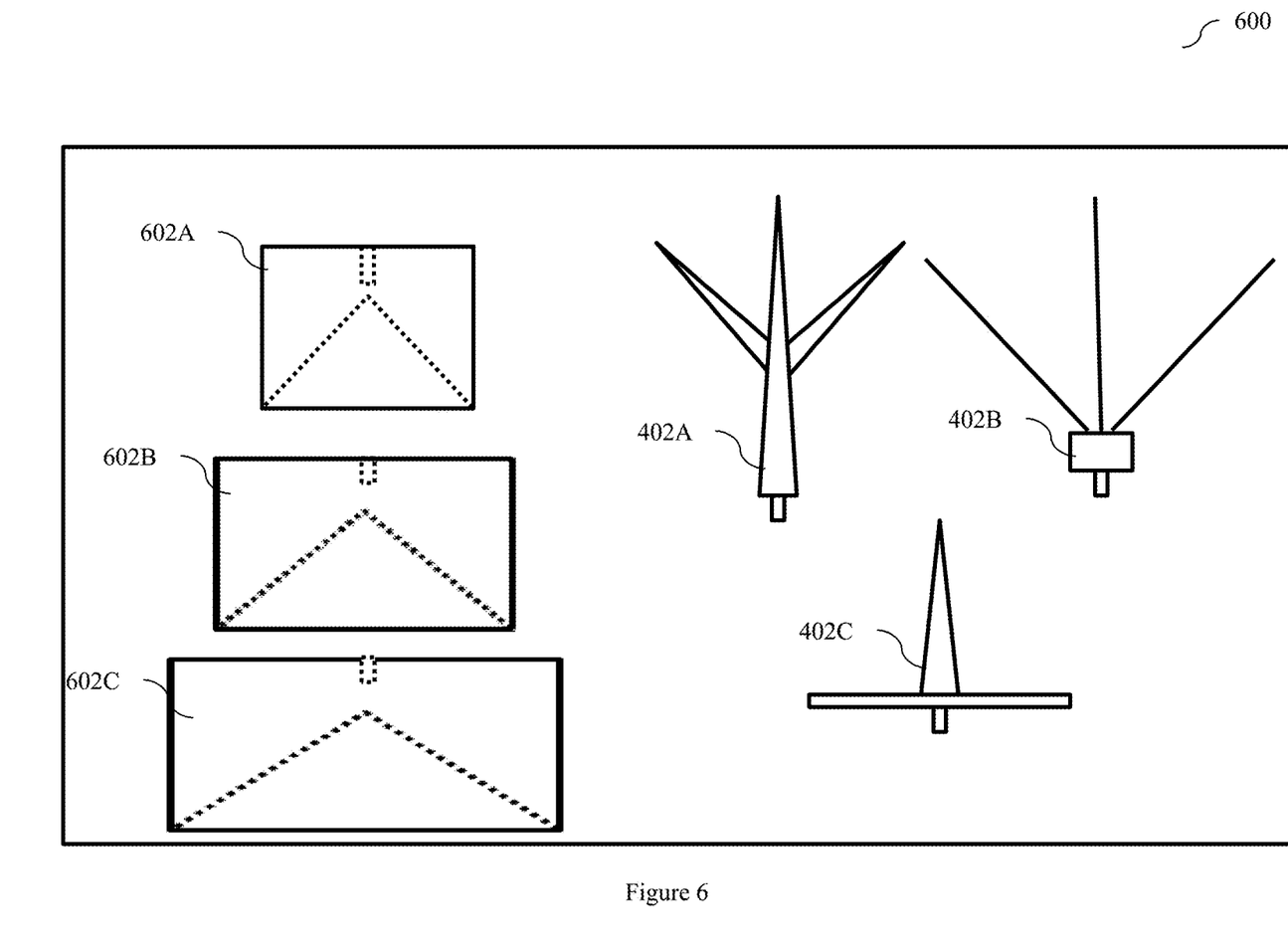
FIG. 6 depicts a kit containing three pole-top spike bases with three respective concavities adapted to receive differently sized pyramid-shaped pole tops and three types of spikes.

FIG. 6 depicts a kit containing three pole-top spike bases with three respective concavities adapted to receive differently sized pyramid-shaped pole tops and three types of spikes.

Bird spike and adapter kit 500 comprises first spike base 602A, second spike base 602B, third spike base 602C, trident-shaped spike 402A, pronged spike 402B, and spike 402C.

Figure 7:
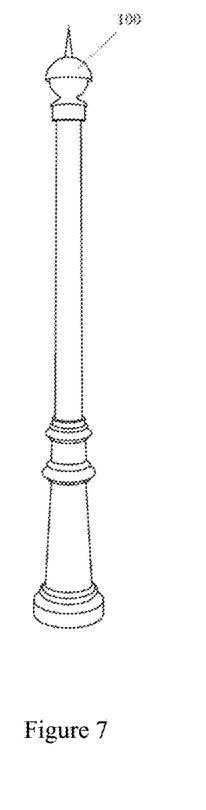
FIG. 7 depicts a side-perspective with a spike base and spike installed.

FIG. 7 depicts a side-perspective with a spike base and spike installed.

Figure 8:
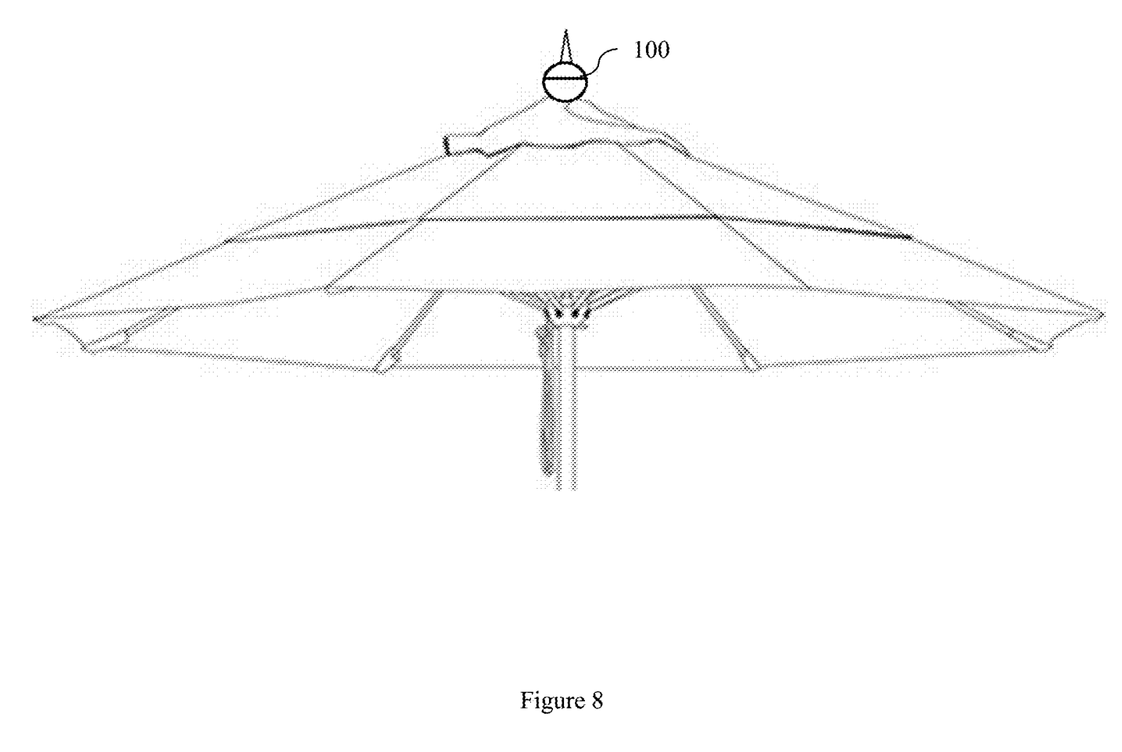
FIG. 8 depicts a perspective view of a patio umbrella with a spike base and spike installed.

FIG. 8 depicts a perspective view of a patio umbrella with a spike base and spike installed.

Figure 9:
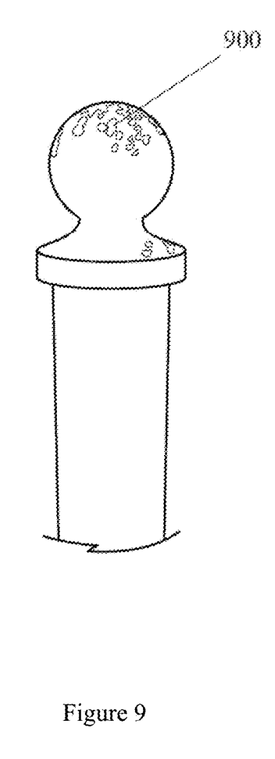
FIG. 9 depicts a perspective view of a pole top with damage from avian excrement.

FIG. 9 depicts a perspective view of a pole top with ornamental and possibly other damage 900 from avian pests. The present invention advantageously prevents the depicted damage to pole tops, which, for example, can be in the form of physical damage from talons, chemical damage from avian excrement, and an aesthetic damage from discoloration and chemical damage.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A kit for deterring avian pests, comprising:
a spike having a first coupling member;
a base having a second coupling member configured to mate with the first coupling member, wherein the base has a first bottom surface; and
an alternative base having a third coupling member configured to mate with the first coupling member,
wherein the alternative base has a second bottom surface,
wherein the first bottom surface and the second bottom surface are differently shaped, and
wherein the first bottom surface and the second bottom surface are concave, and wherein the first bottom surface and the second bottom surface are adapted to receive a complementary convex surface.

2. The kit of claim 1, wherein the first bottom surface comprises a concavity that corresponds to a one inch to four inch diameter.

3. The kit of claim 1, wherein the second bottom surface comprises a concavity that corresponds to a one inch to four inch diameter.

4. The kit of claim 1, further comprising a third base having a fourth coupling member configured to mate with the first coupling member, wherein the third base has a third bottom surface shaped differently from both the first bottom surface and the second bottom surface.

5. The kit of claim 4, wherein the third bottom surface is concave.

6. The kit of claim 1, wherein the spike has a single prong.

7. The kit of claim 1, wherein the spike has at least three prongs.

8. The kit of claim 7, wherein the at least three prongs converge to the first coupling member.

9. A kit for deterring avian pests, comprising:
a spike having a first coupling member;
a base having a second coupling member configured to mate with the first coupling member, wherein the base has a first bottom surface; and
an alternative base having a third coupling member configured to mate with the first coupling member,
wherein the alternative base has a second bottom surface, and
wherein the first bottom surface and the second bottom surface are differently shaped;
an intermediate piece having a coupling mechanism that couples on a top side with the spike and on a bottom side with at least one of the base or the alternative base, and
wherein the first bottom surface and the second bottom surface are concave, and wherein the first bottom surface and the second bottom surface are adapted to receive a complementary convex surface.

10. The kit of claim 9, wherein the second bottom surface comprises a concavity that corresponds to a one inch to four inch diameter.

11. The kit of claim 9, further comprising a third base having a fourth coupling member configured to mate with the first coupling member, wherein the third base has a third bottom surface shaped differently from both the first bottom surface and the second bottom surface.

* * * * *